(No Model.) 2 Sheets—Sheet 1.
L. SIRIEIX.
COMPASS.
No. 551,295. Patented Dec. 10, 1895.
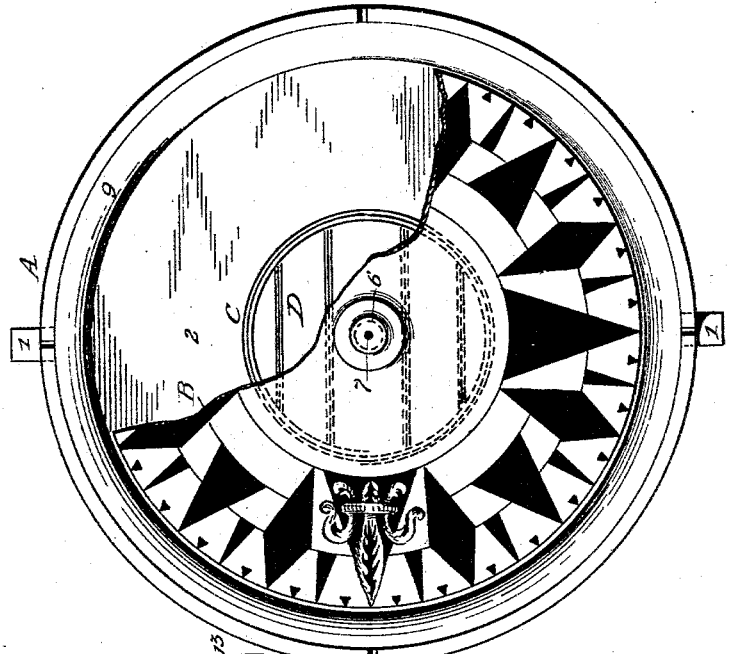
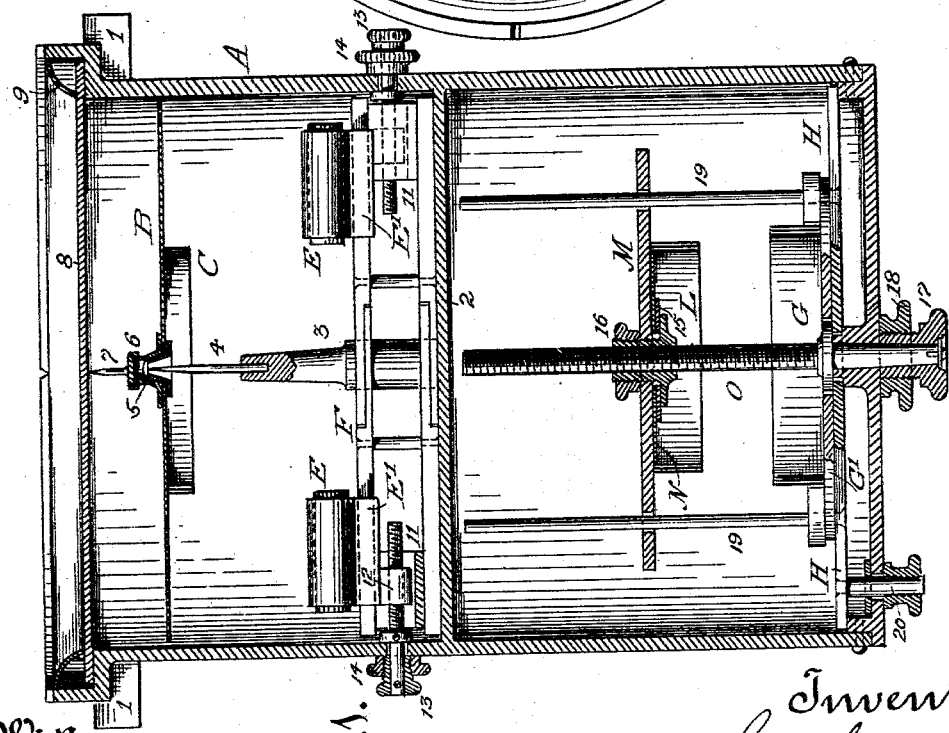
Witnesses.
Inventor.
Léon Sirieix
by Spear & Seely
Attorneys

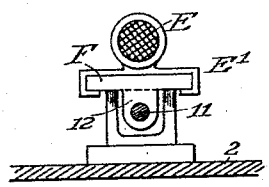
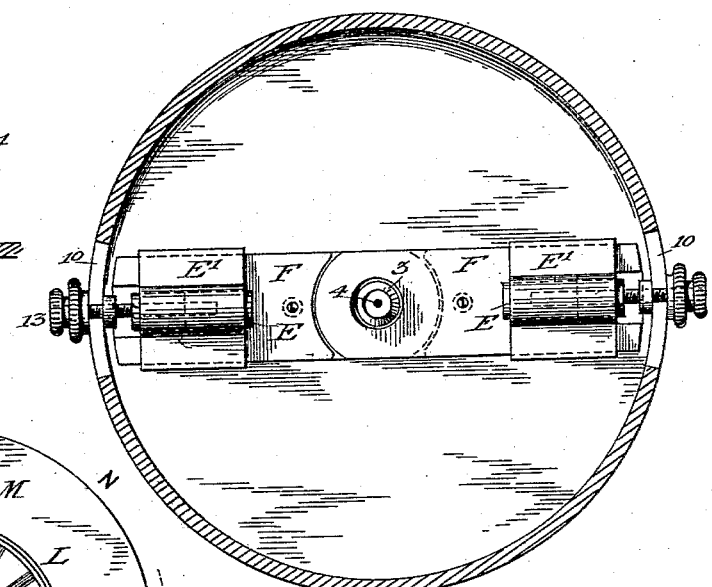
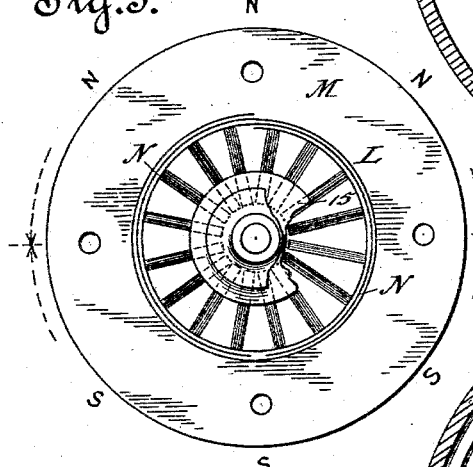
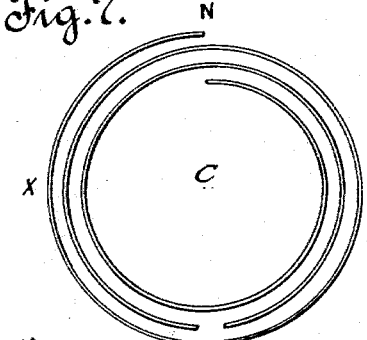
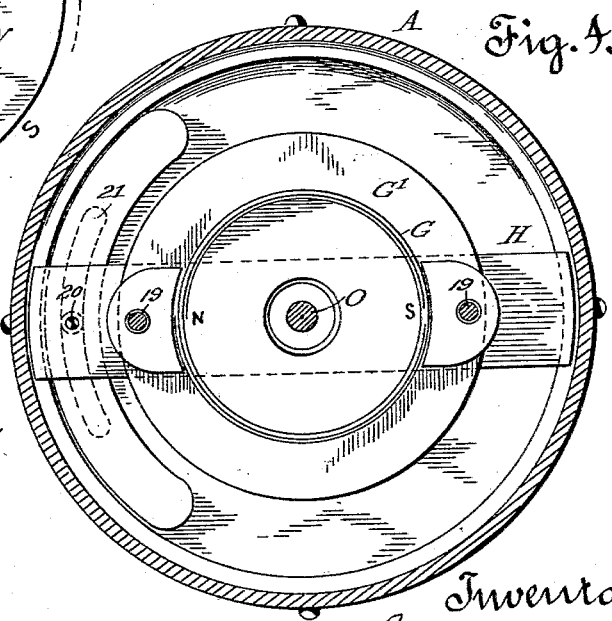

UNITED STATES PATENT OFFICE.

LÉON SIRIEIX, OF SAN FRANCISCO, CALIFORNIA, ASSIGNOR OF THREE-FOURTHS TO GEORGE CHISMORE AND EUGENE P. MURPHY, OF SAME PLACE.

COMPASS.

SPECIFICATION forming part of Letters Patent No. 551,295, dated December 10, 1895.

Application filed May 17, 1895. Serial No. 549,622. (No model.)

*To all whom it may concern:*

Be it known that I, LÉON SIRIEIX, a citizen of the United States, residing at San Francisco, in the county of San Francisco and State of California, have invented certain new and useful Improvements in Compasses; and I do hereby declare that the following is a full, clear, and exact description thereof.

My invention relates to mariners' compasses, and my object is to provide a simple and effective device for correcting the deviations of the magnetic needle arising from the disturbing influences of magnetic bodies in proximity to the compass. The influence of such magnetic bodies when forming a part of the structure of the vessel is termed "subpermanent magnetism." The influence of magnetic bodies not charged with magnetism is due to magnetic induction. Subpermanent magnetism is inherent in iron and steel built vessels. Inductive magnetism is also present in such vessels, as well as in wooden vessels, provided with machinery, smoke-stacks, guns, &c., or loaded with iron or steel cargo.

It is well known that an iron or steel ship while being built, or when for a length of time occupying a certain position relatively to the terrestrial magnetic poles, induces some magnetism, and thus becomes a magnet. This magnetism is called "subpermanent" magnetism, and is subject to alteration by natural or accidental causes, such as by travel for a long time in the same direction, by concussion, &c.

Preliminary to a description of my invention, I will state briefly what the deviations of the compass are, from the different influences which can affect it.

The deviation produced by the subpermanent magnetism of the structure is called a "semicircular" deviation, and it depends upon the magnetic polarity of the ship. This in turn depends upon the position of the ship in the building-dock relatively to the terrestrial magnetic poles. The symbols to express the deviation may be termed "coefficients" $-B$ and $+B$, according as the compass deviates toward stern or bow, as the result of the subpermanent magnetism induced by a position north or south in building, and $-C$ and $+C$ as the result of subpermanent magnetism induced in the vessel when built with her bow toward the west or toward the east. In any case there is always a coefficient $+C$ and $-C$ in the ship, even if she has not been built in the latter position. Iron or steel, which may be parts of the ship, such as machinery, guns, or funnels, or separate bodies, such as cargo, acts upon the compass in two ways: vertically and horizontally. The deviation is quadrantal, produced by iron horizontal with the compass and is expressed by the symbols $+D$ and $-D$. The deviation consequent upon iron placed vertically, relatively to the compass, is a compound deviation with the semicircular B and C. There is also an octantal deviation produced by iron at forty-five degrees, which I express by $+E$ and $-E$. The remaining errors are the heeling-errors $+K$ and $-K$ produced by the listing of the ship to port or starboard, and an error $+A$ or $-A$ produced by the unsymmetrical disposition of iron. This latter is a constant quantity no matter what the direction of the ship is, and when sufficient care is taken need not be considered.

My invention provides a device by which all these coefficients of error can be corrected; and the principal feature of my invention consists in the employment of ring-magnets as compensators, instead of bar-magnets, as commonly used. In addition to this, my invention comprises various special features of construction which are fully hereinafter described and which make a simple, efficient, and thoroughly practical compensated compass.

My invention is fully illustrated in the accompanying drawings, in connection with which the specification should be read.

Figure 1 is a central vertical section of the entire compass; Fig. 2, a top plan of compass-card broken away to show the ring-magnet attached to its lower surface. Fig. 3 is a plan view showing the adjustable induction-block. Fig. 4 is a cross-section through the lower compartment of the compass-case, with the adjustable compensating-disk removed. Fig. 5 is a bottom plan of the adjustable compensating disk. Fig. 6 is an end view of one of the adjustable soft-iron blocks in proximity to the compass-card and its ring-magnet. Fig. 7 is a development of the separate sections of one of the ring-magnets to clearly show their relations to each other.

The compass-case A is a shell or cylinder provided with knife-edged trunnions 1, by which it is hung in the binnacle. The case is preferably divided by a horizontal partition 2 into upper and lower compartments. On the partition 2 and in the upper compartment is mounted the standard 3, which supports the pivot 4, upon which the compass-card B turns, in a hardened bearing 5, of agate or other suitable substance. I prefer to secure to the card a sleeve and cap 6, having a projecting needle 7, which is in close proximity to or in contact with the glass protecting-plate 8. This plate is held in place by a snap-ring 9. To the bottom of the compass-card and surrounding its pivot is a ring-magnet C of peculiar construction. Three of these rings are used in different situations in the compass, and in describing the construction of the ring C, I shall be describing that of the others as well, so that the latter will be understood when referred to hereinafter. The ring is shown as composed of two sections of band-steel tempered like a clock-spring and formed into a helical coil. (See Fig. 7.) One section is slightly longer than the other, and their measurement is such that when coiled each section will make one and one-half turns of the complete ring, its ends reaching exactly both ends of a given diameter of the ring. One section (the shorter) being laid as described, the second is continued from the outer end of the first, tightly overlapping the latter, and, after one and one-half turns, reaching the radial line at which the first ring started. Thus the shorter or inner section begins with its north pole N, and after one and one-half turns terminates at its south pole S opposite. The outer section begins with its south pole, and after one and one-half turns ends at N, its north pole. Thus a two-section ring has three complete turns or circuits, while a ring can be made of four sections in the same way, giving six of such circuits, or of a greater number of sections in the same proportion. The points X and Y at ninety degrees from the poles are perfectly neutral. When the ring is properly charged it exhibits at each extremity of a certain diameter a precise point where the magnetism is at a maximum intensity, while the diameter at right angles with the former shows at each extremity another precise point where the magnetism is absolutely neutral. It therefore has, like a bar-magnet, two opposite poles, but has two opposite neutral points, making it a true magnet. It possesses for this purpose great advantages over a bar-magnet, having a higher degree of power and greater sensibility, precision, and stability. It renders the card steadier and prevents the excessive vibrations to which bar-magnets expose the card. This ring, as stated before, is attached to the compass-card with its poles in proper position relatively to the points marked on the card. Within this ring are four magnetic bars D set edgewise and distant thirty degrees from one another, and in such position that their poles touch the ring, and their polarities correspond with those in the magnetic fields of the ring. The ring and bars act collectively as the needle of the compass.

Mounted upon the partition, and in the upper compartment of the compass-case, are the induction-blocks E E for the compensation of quadrantal deviation. Each of these blocks is a core of soft iron mounted upon a slide E'. Each slide is adjustable upon a transverse strip or frame of brass F, placed on the partition, bringing the cores higher in the compartment that is nearest to the ring, and having the compass-standard passing through their inner ends. They are thus pivoted together and can be turned for a limited distance horizontally, so as to change their radial directions and those of the cores which they support. The walls of the compass-case are slotted at 10, and through the slots project the screw-rods 11, by means of which this horizontal adjustment can be given to the induction-blocks as well as their adjustment toward or from the center standard and ring-magnet. The screw-rods 11 turn in nuts 12 on the slides E' and are provided with thumb-nuts 13 and check-nuts 14. The position of these induction-blocks is to be determined, the operator moving them in or out, or adjusting them horizontally until the compass indicates true magnetic north.

The compensating device for subpermanent magnetism or semicircular deviation is composed of two parts. First, a known and constant coefficient consisting of a ring-magnet fixed to a disk G' upon a movable strip H at the bottom of the compass bowl or case. This ring G is like the one before fully explained. The poles of this magnet are in line with the axis of the ship or parallel to it. This known quantity is inserted in order that the compass may be used in wooden ships, where little or no subpermanent magnetism exists, but where the principal deviations are due to incoming cargo of iron, &c. In other words, this constant quantity can be used to neutralize the compensation for subpermanent magnetism under conditions where the latter does not exist.

The compensation for subpermanent magnetism or semicircular deviation has yet to be described. This is a vertically-adjustable compensator in the lower compartment, consisting of a ring-magnet L, similar to those before described, but the polarity of which is directed in a field opposite to the magnetism of the ship, and opposite to that of the known coefficient G just referred to. A brass disk M carries the ring-magnet L and also sixteen radial bar-magnets N, the outer ends or poles of which are in contact with the ring in the same magnetic field, while their inner ends or poles are in proximity to the center of the disk without touching where they are covered with a soft-iron washer 15 to neutralize their interior polarities. The ring with the radial bars displays a circle with sixteen equal sectors, each truncated near its apex. The correcting power of this magnetic ring is proportionate to the quantity required for all necessary compensation of semicircular deviation, and is of course regulated by its vertical altitude relatively to the compass-card. This disk and magnet are mounted by a sleeve 16 on a screw O rising from the bottom of the compass-case, and which can be turned by a projecting handle 17 and held by a check-nut 18. Guides 19 rising from the strip H and passing through the disk M insure the vertical movement of the latter, but prevent it from turning.

The ring-compensator is adjusted to the line of the ship's magnetism by moving the lower bar or strip H horizontally, thereby moving also the disk M and its ring-magnet, the two magnets L and G being always in the same position relatively to each other, so far as horizontal motion is concerned; but, as their polarities are opposed, it will readily be seen that by adjusting the magnet L downwardly until it meets and enters within the magnet G it will be neutralized by the latter and will exert no effect upon the compass-card. This fully explains the statement before made, that in wooden ships the lower magnet was used to neutralize the upper. In steel and iron vessels where the deviations occur which are corrected by the magnet L and its bars, such magnet must be adjusted upwardly from the magnet G, Fig. 1, before it becomes effective.

The horizontal adjustment of the constant magnet and the adjustable compensating-ring is simply and easily performed by means of the pin 20 which projects through the compass-case, and is secured to the strip H, a slot 21 (dotted lines Fig. 4) being provided in the case to permit it to be moved.

The compensation for semicircular deviation and for quadrantal deviation are thoroughly made by the devices herein described. The remaining deviations when present are compensated by well-known devices forming no part of my invention and not shown in the drawings, but referred to here for the sake of completeness. These are deviations due to vertical iron, such as the masts of the ship, the rudder-post, &c., for which the Flinders bar is used in a well-known way. The other is the heeling-error, which is also compensated by a bar-magnet placed below the compass in an equally well-known way. The theory of compensation for this compass rests on general and well-known laws. Like other compensated compasses, it presents a compensation for all disturbing influences, but unlike them, it combines all the elements of compensation in small compass. It affords by adjustment a magnetic force equal in intensity and contrary in direction to the resulting forces of all magnetic actions, attractions, and repulsions derived from the proximity of all magnetic bodies, without in any way interfering with the action of terrestrial magnetism.

In adjusting the compass, supposing the ship to be at the port of regulation, or under steam or sail in sight of bearings, the adjuster will first see that the soft-iron induction-blocks in the upper compartment are set at right angles to the lubber-line. He also raises the compensating disk in the lower compartment about half-way up the adjusting-screw, or some distance from the constant magnetic ring. Having taken his bearings, he now turns his ship to correct north or south magnetic. If the card should not show north, he will adjust the lower compensation horizontally right or left as the case may be so as to bring the compensation into position with its magnetic field in line with the magnetic forces of the ship and thus bring the card to show north. He will now turn the ship to correct east or west magnetic, and will determine by observation whether and how much it is necessary to adjust the ring-compensation vertically to bring the needle to correct north. The compass is now adjusted for subpermanent magnetism. The deviation for horizontal iron will be corrected with the ship turned into quadrantal position, by adjusting the induction-blocks in the upper compartment toward or from the pivot of the compass until the card again indicates correct north. The use of this compass permits of an immediate adjustment with two bearings at ninety degrees.

What I claim is—

1. In a compass, and in combination with the compass card, an all magnetic ring without projections attached to such card, substantially as described.

2. In a compass, and in combination with the compass card, an all magnetic ring without projections attached to the card and parallel bar magnets connecting the opposing magnetic fields in such ring substantially as described.

3. A magnetic ring for a compass formed of separate helical sections, each section terminating in a magnetic pole in proximity to a magnetic pole of like polarity on another section, substantially as described.

4. A magnetic ring for a compass, formed of two helical sections, coiled one within the other and each having two poles arranged in proximity to corresponding poles on the other section, and all terminating at a line which is a diameter of the complete ring, substantially as described.

5. In a compass, a compensator for subpermanent magnetism, consisting of a magnetic ring having opposite poles at the ends of one of its diameters, and radial bar magnets intersecting such ring, substantially as described.

6. In a compass, a compensator for subpermanent magnetism, consisting of a magnetic ring having opposite poles at the ends of one of its diameters, radial bar magnets intersecting such ring, and a washer or plate of soft iron in contact with the separated inner ends of said radial bars, substantially as described.

7. In a compass, and in combination with the compass card, a compensator for sub-permanent magnetism consisting of a magnetic ring having opposing poles at the ends of one of its diameters and radial bar magnets intersecting such ring, and means for adjusting such ring vertically relatively to the compass card, substantially as described.

8. In a compass, the combination with the compass card, of a compensating ring of a determined polarity which opposes the determined sub-permanent magnetism of a ship, a neutralizing ring of opposite polarity to said compensating ring, and means for adjusting said compensating ring toward and from the compass card and toward and from the neutralizing ring, substantially as described.

9. In a compass and in combination, a compass card, a compensating magnetic ring vertically adjustable, a neutralizing ring of constant and opposing magnetic polarity, a connection between said rings which permits the vertical adjustment of the former, and means for moving the constant ring horizontally and thereby adjusting the compensating ring simultaneously and horizontally, substantially as described.

In testimony whereof I have affixed my signature, in presence of two witnesses, this 8th day of May, 1895.

LÉON SIRIEIX.

Witnesses:
L. W. SEELY,
H. J. LANG.